United States Patent [19]

Edwards et al.

[11] 4,421,682
[45] Dec. 20, 1983

[54] HEATING OF PROTEINACEOUS LIQUIDS

[75] Inventors: Richard H. Edwards; George O. Kohler, both of Albany, Calif.

[73] Assignee: The United States of America as represented by the Secretary of Agriculture, Washington, D.C.

[21] Appl. No.: 251,667

[22] Filed: Apr. 6, 1981

[51] Int. Cl.³ .............................. C07G 7/00; A23J 1/14
[52] U.S. Cl. .................. 260/112 R; 165/108; 165/134 R; 165/139; 422/203; 260/112 B; 260/112 G; 426/656
[58] Field of Search .................. 165/108, 134 R, 139; 260/112 R, 112 B, 112 G; 420/203

[56] References Cited

U.S. PATENT DOCUMENTS

| | | | |
|---|---|---|---|
| 3,684,520 | 8/1972 | Bickoff et al. | 260/112 X |
| 3,775,133 | 11/1973 | Batley, Jr. | 260/112 X |
| 3,807,963 | 4/1974 | Smith | 165/108 X |
| 3,823,128 | 7/1974 | Bickoff et al. | 260/112 |
| 4,006,078 | 2/1977 | Bickoff et al. | 426/489 X |
| 4,064,283 | 12/1977 | Saunders et al. | 426/656 X |
| 4,254,818 | 3/1981 | Melamed | 165/134 R X |

*Primary Examiner*—Howard E. Schain
*Attorney, Agent, or Firm*—M. Howard Silverstein; David G. McConnell; Margaret A. Connor

[57] ABSTRACT

A method of raising the temperature of a liquid containing heat coagulable proteins above the coagulation temperature of the proteins to coagulate them using a heat exchanger to transfer heat from the heat source to the liquid without contact between the liquid containing the uncoagulated heat coagulable protein and the heat exchanging surface is described.

12 Claims, 6 Drawing Figures

HEATING OF PROTEINACEOUS LIQUIDS

BACKGROUND OF THE INVENTION

1. Field of Invention:

This invention relates to and has among its objects the provision of novel methods for heating a liquid containing heat coagulable proteinaceous material to a temperature above the coagulation temperature of the protein. Further objects of the invention will be evident from the following description where parts and percentages are by weight unless otherwise specified.

2. Description of the Prior Art:

In the processing of many liquids containing heat coagulable proteinaceous material, it is often necessary to heat the liquid to a temperature above the coagulation temperature of the proteins in the liquid and thereby precipitate the proteins contained therein. Conventionally, steam is injected into the liquid to raise its temperature to the desired point. During treatment with steam the amount of water in the liquid being heated is increaased, often by 12% or more. Frequently, the water added during the steam injection step must be removed, and thus the time expenditure and energy requirements of the drying process per unit weight of product is increased. In addition, the volume of water added from steam injection reduces the production capacity of the equipment by this volume, so that, when steam injection is used, additional capital expenditure for larger capacity equipment is required to process the equivalent amount of material as that when steam injection is eliminated.

It is possible to avoid steam injection and raise the temperature of the liquid by employing a solid surface heat exchanger. The term "solid surface heat exchanger" is used synonymously with "heat exchanger" and is defined as a device to transfer heat from a heat source to a cooler liquid by means of a heat transferring solid surface. The heat source used to heat the solid surface may be a heated fluid, electricity or the like.

Problems result when a liquid containing heat coagulable proteinaceous material is introduced into a heat exchanger for the purpose of raising the liquid temperature above the protein coagulation temperature. During such heating processes, the hot heat exchanger wall becomes rapidly coated with protein substances which decrease the ability of the heat exchanger to transfer heat from the heat source to the cooler liquid thus destroying the efficiency of the heating process. As the heat exchanger becomes coated or fouled, the heat transfer coefficient declines steadily and rapidly so that the temperature of the liquid to be heated can be raised to the desired level so as to coagulate the remaining protein only after prolonged application of heat which is economically prohibitive.

Mechanically aided heat exchangers equipped with blades attached to a rotor to continuously scrape the heat exchanger surface and remove the fouling film are available for commercial use. However, this type of equipment is expensive and unreliable. Furthermore, high maintenance costs are required to keep such exchangers operable. Also, in the processing of some liquids containing heat coagulable proteinaceous material such as the waste water from potato processing, the extreme fouling which results from heating in a heat exchanger often can not be removed by cleaning in-place procedures and laborious and costly manual scraping is necessary.

SUMMARY OF THE INVENTION

The invention described herein provides means for obviating the problems outlined above. In the method of the invention the temperature of a liquid containing heat coagulable proteinaceous material is raised above the coagulation temperature of the proteins using a heat exchanger to transfer heat from the heat source to coagulate the proteins without contact between the liquid containing uncoagulated heat coagulable protein and the heat exchanging surface.

In this method, the liquid containing heat coagulable proteinaceous material is raised to a temperature above the coagulation temperature of the heat coagulable proteins by mixing it with an amount of liquid previously heated in a heat exchanger at a temperature sufficient to raise the temperature of the mixed liquids above the coagulation temperature of the heat coagulable proteinaceous material to coagulate the proteins, thus, the proteins are coagulated without exposure to a heat exchanger surface. In one method of the invention, the previously heated liquid contains proteinaceous material which has been previously heat coagulated. In other instances, the mixture of liquids containing heat coagulated protein is further heated in a heat exchanger. Since the heat coagulable proteins have already been coagulated, fouling due to heat coagulation of the proteins on the heat exchanger surface is avoided.

This novel process can operate continuously to heat liquids containing heat coagulable proteinaceous material using a heat exchanger as the heat source and results unexpectedly in the successful use of a heat exchanger to indirectly heat liquids containing heat coagulable protein to a temperature above the coagulation temperature to coagulate the proteins therein without fouling of the heat exchanger.

The primary advantages of the aforedescribed method are that (1) the full benefit of inexpensive heat exchangers can be realized without the need for continuous mechanical scraping and (2) the use of steam injection and the added volume of water therefrom is avoided. This elimination of steam injection increases the throughput volume through the system with minimal capital expenditure and no increase in fuel requirements. It also decreases the amount of water which must be evaporated or disposed of during processing of the residual liquor from the protein recovery system. This results in a considerable saving of energy. When steam is used as the heat source for the heat exchanger, the hot condensate from the heat exchanger can be recycled directly to the boiler thus saving both the cost of heating the boiler feed from the cold water temperature to the condensate temperature and the cost of chemically treating the water to produce acceptable boiler make up water.

DESCRIPTION OF THE PREFERRED EMBODIMENTS

Figure 1:
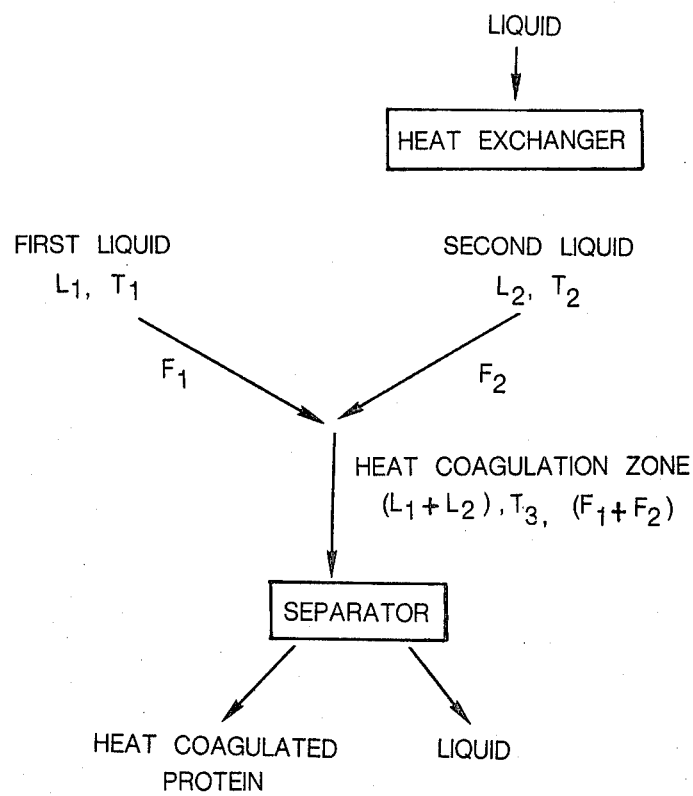
FIGS. 1-6 are flow diagrams of particular embodiments of the method of the invention.

The method of the invention described herein may be applied to the processing of any liquid containing heat coagulable proteinaceous material where it is desirable to heat coagulate the protein. The method is of particular value in coagulating proteins in the liquid obtained by the pressing of fresh chopped alfalfa such as described in U.S. Pat. Nos. 3,684,520 ('520), 3,823,128 ('128), 3,359,246 ('246), 4,006,078 ('078), and 3,775,133 ('133) or from the processing of similar forages or other leafy green crops such as lettuce, cabbage, pea or bean vines, celery tops and the like and from other leafy vegetable sources. The invention may also be applied in the processing of liquids obtained from the extraction of grain products such as described in U.S. Pat. No. 4,064,283, as well as the processing of liquids obtained from animal sources such as during the processing of commercial animal blood, egg albumin, and the like. It is also expected to find use in processing waste water such as that obtained from brewer's yeast waste or from potato processing waste water streams and thereby decrease water pollution from these sources. In the case of potato waste water, it is contemplated that the liquids may be held at elevated pressures so as to obtain the 221°–239° F. or higher temperatures required to completely precipitate the protein. Thus, the invention finds utility whenever it is desired to coagulate proteins from a liquid containing heat coagulable material.

The invention next will be described in detail as applied to alfalfa juice containing heat coagulable proteinaceous material derived from the processing of alfalfa to obtain protein concentrates. It is, however, to be noted that this direction is by way of illustration only and is not meant to be a limitation of the scope of the instant invention. In its broad ambit the method described herein may be applied to liquids containing any heat coagulable proteins.

Alfalfa juice at ambient temperature is obtained by pressing ground freshly chopped alfalfa. In the preferred method, cooled dilute alfala solubles obtained from a later stage of the process are added to the alfalfa prior to grinding as described in '133 and Edwards et al., *J. Agr. Food Chem.*, Vol. 26, page 738 (1978), so as to increase the yield. Additives, such as those to assist in processing efficiency such as antifoaming agents or those which affect end-product yield and quality such as ammonia, antioxidants and the like, may be added to the fresh alfalfa or to the juice obtained by pressing. The liquid from the press is collected in stationary tanks. After removal of traces of fibrous material, the juice flows into a surge tank.

In the embodiment shown in FIG. 1, the alfalfa press juice (first liquid, $L_1$), which has had no prior heat treatment or which has been preheated using waste heat sources to a temperature ($T_1$) below that at which alfalfa proteins coagulate, preferably below 113° F., is pumped by a positive displacement pump at flow rate ($F_1$) into the heat coagulation zone where it is mixed with an amount of a second liquid ($L_2$) which has been heated to a temperature ($T_2$) using a heat exchanger. The flow rate ($F_2$) of the second liquid is such that the temperature of the mixed liquids ($L_1$ plus $L_2$) in the heat coagulation zone ($T_3$), is approximately 153°–250° F. and preferrably 175° to 195° F. so as to coagulate and precipitate the heat coagulable proteinaceous material contained therein. At its natural pH (i.e., 5.8–6.1) coagulation of the alfalfa protein generally begins to occur at about 113° F.

It should be noted that protein coagulation is a time-temperature relationship, requiring longer holding times at the lower temperatures. Slight differences in temperatures are noted if the juice is coagulated at more alkaline or acidic pH's. It is a critical feature of the method that the heat coagulation zone be such that at the process flow rate in the coagulation zone ($F_1+F_2$), sufficient time is allowed at the mixed temperature ($T_3$) for protein heat coagulation to be sufficient to avoid fouling of a heat exchanger surface. The resulting product is heat coagulated protein in the first and second liquid mixture. Separation of any amount of the protein from the liquid may be effected by conventional procedures such as centrifugation, decantation, filtering and the like.

Figure 2:
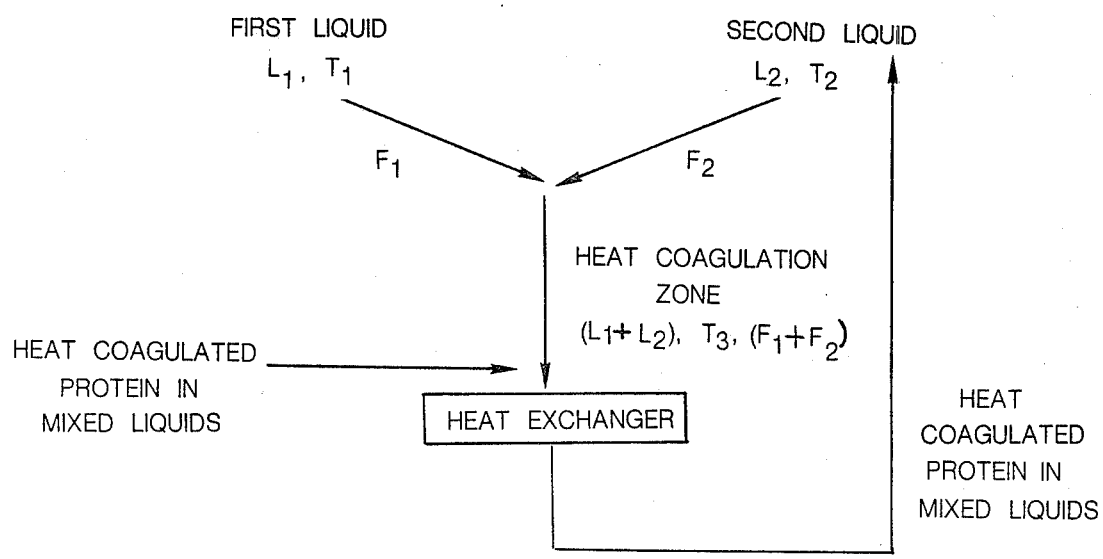

In the embodiment of FIG. 2, a portion of the mixed liquids ($L_1+L_2$) is introduced into a heat exchanger after mixing in the heat coagulation zone. The mixed liquids are heated with the heat exchanger to a temperature $T_2$ or higher (153° F.$<T_2\leq$250° F.) and recycled back into the system as second liquid, $L_2$ to be mixed with the incoming alfalfa juice (first liquid, $L_1$) to coagulate the proteins therein. A portion of the mixed liquids containing heat coagulated protein is diverted out of the system prior to introduction into the heat exchanger. As in the FIG. 1 embodiment, the precipitated alfalfa protein may be separated as leaf protein concentrate from the liquid containing alfalfa solubles by centrifugation, filtering and the like.

It is critical that the temperature of the mixed liquids in the heat coagulation zone and the residence time therein be such that the heat coagulable proteins are sufficiently heat coagulated to avoid fouling of the exchanger surface by protein coagulation. It is to be noted that in the case where the first liquid, $L_1$, is alfalfa press juice, the temperature of the mixed liquids must be above approximately 153° F. or fouling of the heat exchanger during subsequent heating will occur. The heat source for the heat exchanger surface may be steam, hot water, electricity or any other source at a temperature sufficiently high to enable the mixed liquid to be heated to $T_2$.

Figure 3:
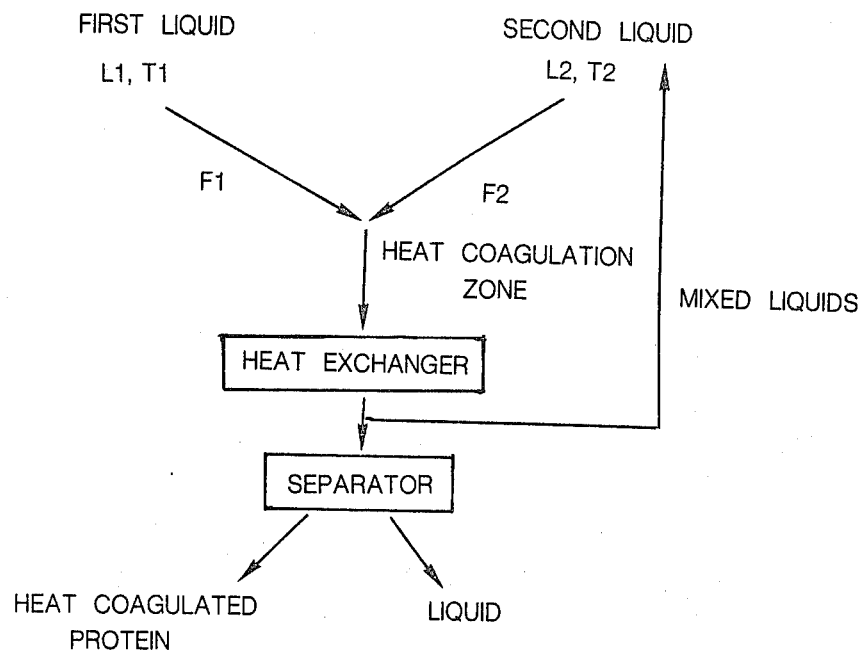

In the embodiment of FIG. 3, all the mixed liquids ($L_1+L_2$) are heated in the heat exchanger, to a temperature $T_2$. A portion of the mixed liquids are recycled back into the system (as second liquid, $L_2$) to be mixed with the incoming alfalfa juice (first liquid, $L_1$). Another portion of the mixed liquids is passed to a separator where the precipitated alfalfa protein is separated as leaf protein concentrate from the dilute alfalfa solubles.

Figure 4:
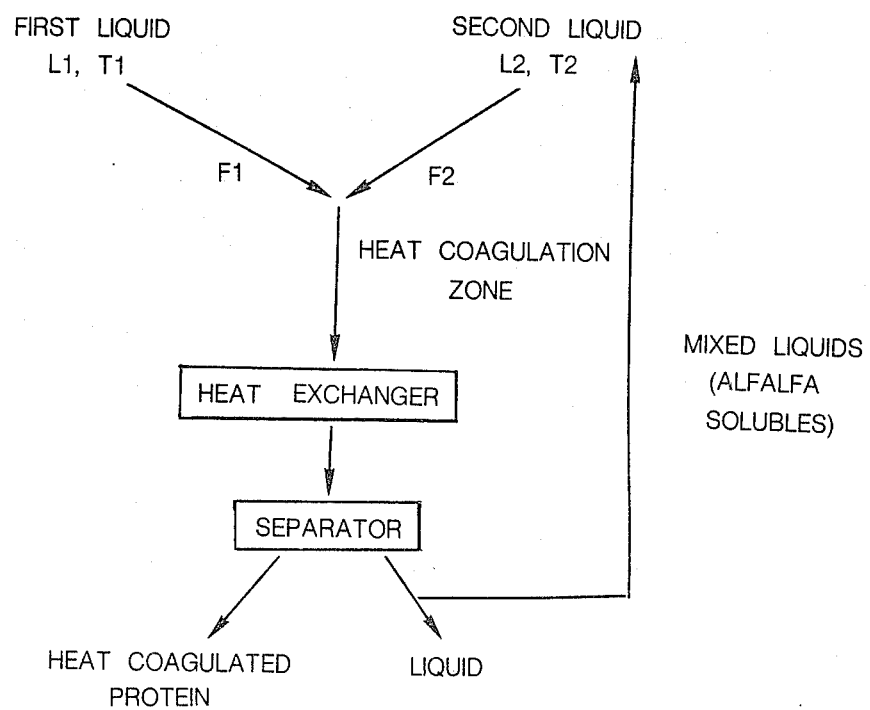

In the embodiment of FIG. 4, all of the heated mixed liquids from the heat exchanger at temperature, $T_2$, are passed to a separator and a portion of hot alfalfa solubles (separated mixed liquids) are recycled back into the system as $L_2$ for use in heating the first liquid ($L_1$). The unrecycled portion of dilute alfalfa solubles continues through the process where normally a portion of the stream is cooled to 104° F. or less for addition to the fresh alfalfa prior to grinding and the remainder is concentrated in a vacuum evaporator or otherwise disposed of.

Figure 5:
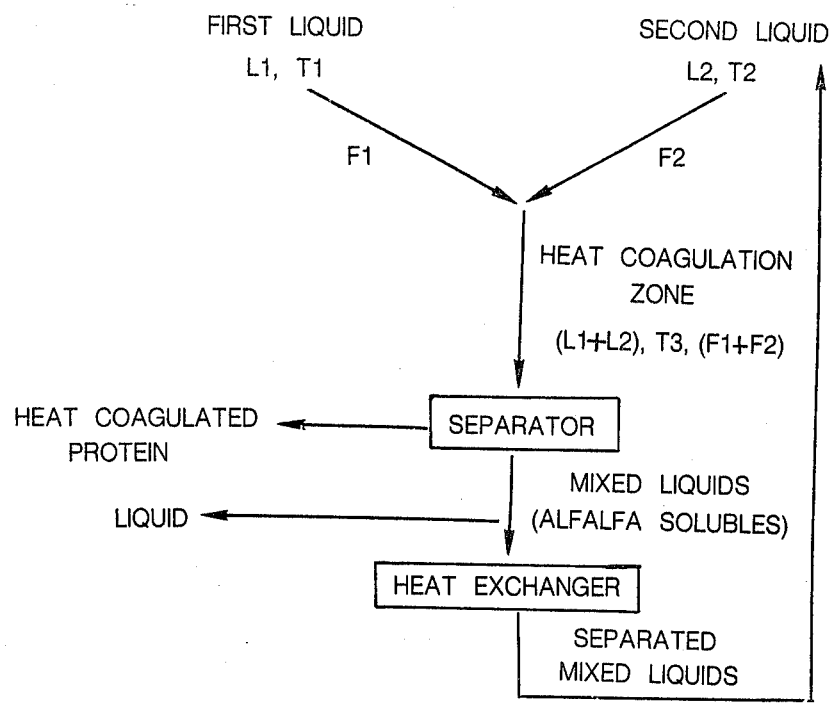
Figure 6:
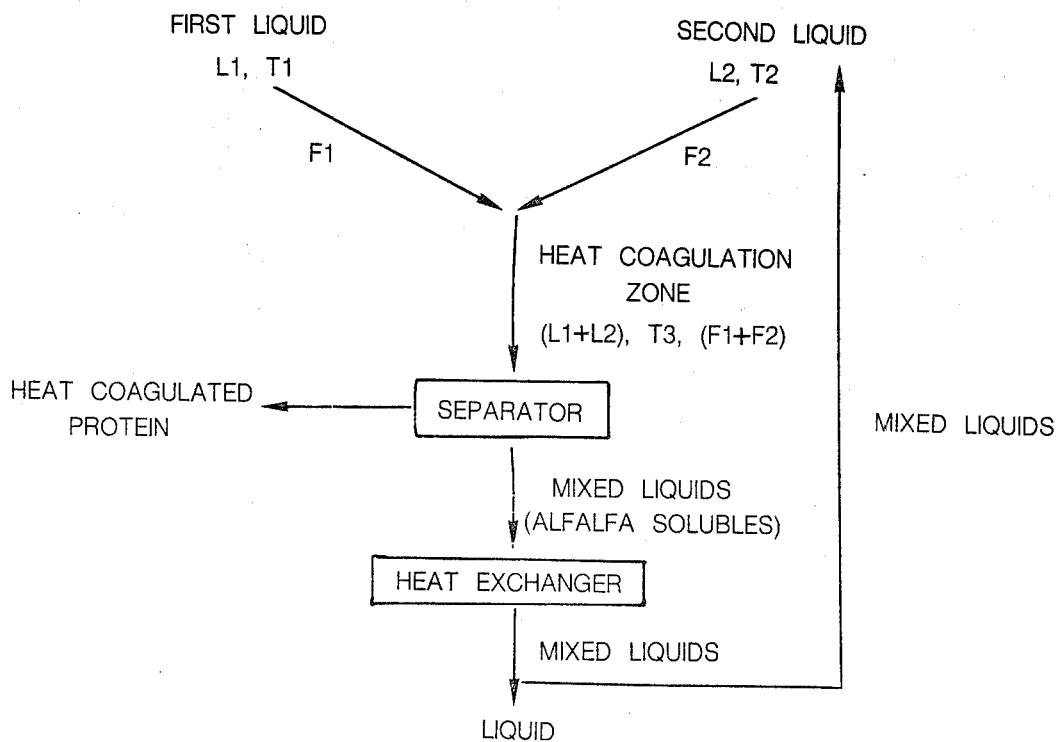

In the configuration of FIG. 5, the mixed liquid ($L_1+L_2$) at $T_3$, containing heat coagulated protein, is separated into heat coagulated protein and alfalfa solubles. A portion of mixed liquids is diverted out of the system and a portion is heated by a heat exchanger and recycled. The embodiment of FIG. 6 is similar to FIG. 5 except that the portion of mixed liquids diverted out of the system is heated with the heat exchanger prior to removal from the system.

As shown in FIGS. 2–6, portions of separated protein, alfalfa solubles and protein-liquid mixture may be diverted out of the system and the rest recycled. The total volume diverted should be equivalent to $L_1$. The remaining portion, equivalent in volume to $L_2$, is recycled.

In the overall process encompassed by the invention, therefore, uncoagulated alfalfa juice ($L_1$) at $T_1$ and heat (for the heat exchanger) enter the system and coagulated alfalfa protein, alfalfa solubles and/or protein-liquid mixture, equivalent in volume to $L_1$ at a temperature $T_2$ or $T_3$ are discharged from the system, such process occurring quickly, efficiently, and without disruptive fouling of the heat transfer surfaces of the heat exchanger. Assuming no heat capacity changes with temperature and ignoring heat losses to the surroundings and the protein heat of denaturation, the appropriate flow rates for $F_1$ and $F_2$ are a ratio determined by the formula:

$$F_2/F_1 = (T_3 - T_1)/(T_2 - T_3)$$

where $F_2$ is the flow rate of $L_2$, $F_1$ is the flow rate of $L_1$, $T_1$ is the temperature of the first liquid, $T_2$ is the temperature of the second liquid and $T_3$ is the temperature of the mixed liquids and where $T_2 > T_3 > T_p$ (temperature at which the protein coagulates) $> T_1$.

The process may also be operated as a batch-wise operation as shown in FIG. 1. The same temperature ranges for $T_1$, $T_2$ and $T_3$ apply to the batch process. The appropriate temperature ranges and flow rates for processing protein containing liquids other than alfalfa juice may be determined by consulting the literature or by pilot trials.

EXAMPLE 1

This example demonstrates a continuous process whereby a liquid containing heat coagulable proteinaceous material is heated from ambient temperature to a temperature above the coagulation temperature, thereby coagulating the protein contained therein using a solid surface heat exchanger as a sole heat source to coagulate the proteins therein without disruptive fouling the heat exchanger in accordance with the invention.

Five hundred gallons of green alfalfa juice representative of that produced during the commercial production of leaf protein concentrate was obtained by grinding and pressing freshly chopped alfalfa to which dilute alfalfa solubles had been added. The unheated alfalfa juice (first liquid, $L_1$) at ambient temperature $T_1$ (67° F.), containing heat coagulable proteinaceous material was pumped at 1¼ gallons per minute into a mixing tee where it was mixed with heated alfalfa juice (second liquid, $L_2$) at temperature $T_2$ and containing protein which had been heat coagulated previously. The pumping rate of the second liquid was 10¾ gal./min. The mixed liquids ($L_1 + L_2$), now at temperature $T_3$, were transported through 60 feet of insulated 1 inch hose to provide a 12 second holding period (heat coagulation zone) to heat coagulate the non-coagulated proteinaceous material in the first liquid. Next, the mixed liquids entered a non-contact heat exchanger where they were heated 11°-15° F. to regain temperature $T_2$. The heat exchanger consisted of a steam heated helical tubular coil rotating at 250 RPM inside a stainless steel tank. A volume of heated liquid sufficient to cover the rotating coil was maintained in the tank. A portion of the mixed liquid ($L_1 + L_2$) discharged from the heat exchanger at $T_2$ was recycled as second liquid $L_2$ to be mixed with additional fresh alfalfa juice. The remainder (1¼ gal/min) of the mixed liquid, a volume equivalent to $L_1$ (the first liquid), continued on to another part of the process.

The temperature of the heated mixed liquid was maintained at temperature $T_2$ in the heat exchanger by a control system consisting of a thermal sensor controller and steam control valve. The overall heat transfer coefficient, U (BTU/sq.ft. °F.hour), was calculated from measurements of the steam temperature, temperature $T_2$, and the weight of condensate collected per unit time from the steam coil. Initially, $T_2$ was maintained at 200° F. After collecting condensate for 30 or more minutes, the heated mixed liquid temperature in heat exchanger ($T_2$) was decreased by altering the control temperature setting and condensate was again collected once the system had stabilized.

From the data tabulated below, it can be seen that the heat transfer coefficient remained constant with time if the temperature ($T_3$) of the mixed first and second liquids was maintained at 160° F. or higher prior to entering the heat exchanger. However, when the mixed temperature was reduced to 153° F. or lower the heat transfer coefficient decreased rapidly toward zero. Thus, it is important that the temperature, $T_3$, of the mixed first and second liquids ($L_1 + L_2$) be maintained above 153° F. when coagulating alfalfa protein using this particular system. Holding the temperature at 160° F. would appear to provide a suitable margin of safety. Under these conditions the heat coagulable protein present in the first liquid $L_1$ is coagulated prior to entering the heat exchanger and disruptive fouling does not occur.

| | Heat Transfer Coefficient (% of Initial) | | | | | |
|---|---|---|---|---|---|---|
| Elapsed Time (min) | Expt. 1 $T_3$ ML = 188° F. $T_2$ TL = 200° F. | Expt. 2 $T_3$ ML = 178° F. $T_2$ TL = 189° F. | Expt. 3 $T_3$ ML = 168° F. $T_2$ TL = 181° F. | Expt. 4 $T_3$ ML = 165° F. $T_2$ TL = 176° F. | Expt. 4 $T_3$ ML = 160° F. $T_2$ TL = 171° F. | Expt. 5 $T_3$ ML = 153° F. $T_2$ TL = 165° F. |
| 1 | 100 | 100 | 100 | 100 | 100 | 100 |
| 3 | 101.0 | 102.0 | 99.2 | 93.0 | 123.7 | 89.6 |
| 5 | 102.1 | 99.6 | 100.0 | 100.0 | 85.5 | 87.6 |
| 7 | 107.7 | 106.2 | 102.5 | 104.5 | 134.7 | 84.1 |
| 9 | 100.1 | 90.9 | 99.2 | 109.2 | 87.4 | 77.8 |
| 11 | 98.0 | 101.7 | 91.8 | 102.6 | 136.0 | 74.1 |
| 13 | 97.1 | 101.7 | 98.6 | 98.9 | 87.4 | 77.4 |
| 15 | 103.5 | 101.7 | 98.6 | 113.4 | 126.4 | 75.2 |
| 17 | 99.1 | 105.9 | 98.6 | 111.1 | 107.0 | 59.7 |
| 19 | 103.4 | 96.9 | 97.5 | 98.1 | 107.0 | 63.1 |
| 21 | 93.6 | 95.0 | 97.1 | 98.9 | 111.7 | 60.9 |
| 23 | 99.2 | 104.1 | 191.3 | 100.8 | 111.7 | 58.5 |
| 25 | 101.4 | 105.4 | 100.4 | 109.6 | 107.0 | — |
| 27 | 98.4 | 100.6 | 105.9 | 111.5 | 103.2 | 60.7 |
| 29 | — | — | 93.4 | 111.5 | 124.1 | 51.5 |
| 39 | — | — | — | — | — | 32.8 |

-continued

| Elapsed Time (min) | Heat Transfer Coefficient (% of Initial) | | | | | |
|---|---|---|---|---|---|---|
| | Expt. 1<br>$T_3$ ML = 188° F.<br>$T_2$ TL = 200° F. | Expt. 2<br>$T_3$ ML = 178° F.<br>$T_2$ TL = 189° F. | Expt. 3<br>$T_3$ ML = 168° F.<br>$T_2$ TL = 181° F. | Expt. 4<br>$T_3$ ML = 165° F.<br>$T_2$ TL = 176° F. | Expt. 4<br>$T_3$ ML = 160° F.<br>$T_2$ TL = 171° F. | Expt. 5<br>$T_3$ ML = 153° F.<br>$T_2$ TL = 165° F. |
| 51 | — | — | — | — | — | 21.4 |

ML = Mixed Liquid
TL = Tank Liquid

EXAMPLE 2

This example demonstrates heating of a liquid containing heat coagulable proteinaceous material in a solid surface heat exchanger without fouling the heat exchanger in accordance with the invention. A comparison of the heat transfer coefficient is made to that obtained when water is heated in the same heat exchanger.

As in example 1, freshly chopped alfalfa to which cooled alfalfa solubles were added (50% of fresh alfalfa wt.), was ground and pressed to obtain whole green alfalfa juice containing coagulable proteinaceous material. The fresh alfalfa juice (first liquid, $L_1$) at 67° F. ($T_1$) was pumped at 1¾ gallons per minute into a mixing tee where it was combined with alfalfa juice (second liquid, $L_2$) containing coagulated protein at $T_2$ (194° F.), and pumped at 14 gallons per minute. The temperature ($T_3$) of the mixed liquids ($L_1 + L_2$) in the holding tube was 180° F. ($T_3$) causing the protein in the first liquid to coagulate. The mixed liquids were then heated to 194° F. in the non-contact heatexchanger described in example 1.

The heat transfer coefficient, U, (BTU/ft²hr°F.) of the heat exchanger was measured as a function of elapsed operating time, for approximately 3½ hours. A comparison run was made with water using the same system. Least squares analysis of the data resulted in the equation: $U = 647 - 0.040\ T$, where T is the elapsed time in minutes. The percent of initial heat transfer coefficient over time was calculated. This data demonstrates that after 3½ hours of continuous heat exchanger use, the heat transfer coefficient is essentially unchanged. The rate of decrease of the heat transfer coefficient indicated by the least squares analyses, 0.37% per hour, is considered economically acceptable and is probably due to calcium and other salts present in the alfalfa juice. The results are tabulated below.

| Elapsed Time (minutes) | Heat Transfer Coefficient, U (BTU/ft²hr °F.) | | Heat Transfer Coefficient (% of Initial) | |
|---|---|---|---|---|
| | Alfalfa Juice | Water | Alfalfa Juice | Water |
| 1.5 | 640 | 640 | 99 | 100 |
| 10.5 | 650 | 640 | 100 | 100 |
| 16.5 | 640 | 640 | 99 | 100 |
| 34.5 | 620 | 640 | 96 | 100 |
| 49.5 | 630 | 650 | 97 | 102 |
| 58.5 | 630 | 650 | 97 | 102 |
| 79.5 | 640 | 640 | 99 | 100 |
| 103.5 | 650 | 660 | 100 | 103 |
| 121.5 | 650 | 650 | 100 | 102 |
| 139.5 | 640 | 650 | 99 | 102 |
| 160.5 | 650 | 650 | 100 | 102 |
| 178.5 | 640 | 650 | 99 | 102 |
| 199.5 | 640 | — | 99 | — |
| 214.5 | 640 | — | 99 | — |

EXAMPLE 3

This example demonstrates the heating of a liquid containing heat coaguable protein in a solid surface exchanger which is not in accordance with the invention and whereby fouling of the heat exchanger occurs. A comparison of the heat transfer coefficient is made to that obtained when water is heated under the same conditions.

Two hundred pounds of alfalfa juice obtained by pressing fresh alfalfa containing coagulable proteinaceous material at ambient temperature were heated in a tank containing a rotating stainless steel tubular coil having an area of 2.7 ft² and using 20 psig steam as the heat source. It took three hours for the alfalfa juice to reach 190° F. Severe fouling of the heat exchanger was indicated by the rapid decline of the heat transfer coefficient, U, (BTU/hr ft²°F.). The value of U after 1 minute was 120; this value dropped to 39 within 15 minutes and after 150 minutes of heating the value was 14.

For purposes of comparison, water was heated under the same conditions. The boiling point of water was reached within 20 minutes of heating. The heat calculated transfer coefficient, U, remained approximately constant at about 300 BTU/hr ft²°F. indicating that there was no fouling of the heat exchanger surface and that the efficiency of the heat exchanger remained high. The results are tabulated below.

| Elapsed Time of Heating in the Heat Exchanger (minutes) | Heat Transfer Coefficient, U (BTU/ft²hr °F.) | | Heat Transfer Coefficient (% of original) | |
|---|---|---|---|---|
| | Water | Alfalfa Juice | Water | Alfalfa Juice |
| 1.0 | 279 | 120 | 100.0 | 100.0 |
| 2.0 | 276 | 111 | 98.9 | 92.5 |
| 4.5 | 336 | 79 | 120.4 | 65.8 |
| 8 | 336 | 62 | 120.4 | 51.7 |
| 12.5 | 272 | — | 97.5 | — |
| 15 | 291 | 39 | 104.3 | 32.5 |
| 18.5 | 330[1] | — | 118.3[1] | — |
| 20 | — | 41 | — | 34.2 |
| 25 | — | 36 | — | 30.0 |
| 35 | — | 25 | — | 20.8 |
| 60 | — | 24 | — | 20.0 |
| 75 | — | 23 | — | 19.2 |
| 90 | — | 22 | — | 18.3 |
| 120 | — | 18 | — | 15.0 |
| 150 | — | 14 | — | 11.7 |
| 180 | — | —[2] | — | —[2] |

[1] Water approaching the boiling point, 212° F.
[2] Alfalfa juice temperature, 190° F.

Having thus described the invention, what is claimed is:

1. A method of raising the temperature of a first liquid containing uncoagulated heat coagulable proteins above the coagulation temperature of said proteins to coagulate said proteins, by means of a heat exchanger without contact between said first liquid and said heat exchanging surface, which comprises:

mixing said first liquid with an amount of a second liquid which has been previously heated in a heat exchanger, the temperature of said second liquid being sufficient to raise the temperature of said first liquid above the coagulation temperature of said heat coagulable proteins therein; and holding said mixed liquids together for a time sufficient to coagulate said proteins in said first liquid.

2. The method of claim 1 wherein said first liquid having said heat coagulable proteins heat coagulated is further heated in said heat exchanger.

3. A method of raising the temperature of a first liquid containing uncoagulated heat coagulable proteins above the coagulation temperature of the proteins using a heat exchanger as the heat source to coagulate the proteins therein within contacting said first liquid with said heat exchanger, which comprises:

providing a second liquid, said second liquid having its heat coagulable proteins heat-coagulated and provided in an amount and at a temperature such that upon mixing with said first liquid containing heat coagulable proteins the temperature of the mixture is above the coagulation temperature of the proteins in said first liquid; and holding together said first and second liquids for a time sufficient to coagulate said proteins in said first liquid.

4. The method of claim 3 wherein at least a portion of said mixed liquids is heated further in said heat exchanger.

5. The method of claim 3 wherein said second liquid contains a portion of said mixed liquids.

6. The method of claim 4 wherein a portion of said mixed liquids is treated to separate the heat coagulated protein therefrom.

7. The method of claim 4 wherein a portion of said mixed liquids having the heat coagulated protein separated therefrom is recycled as said second liquid.

8. The method of claim 4 wherein a portion of said mixed liquids is treated to separate the heat coagulated protein therefrom prior to heating further in said heat exchanger.

9. The method of claim 1 wherein said first liquid containing heat coagulable proteinaceous material is derived from the processing of alfalfa.

10. The method of claim 1 wherein said first liquid containing heat coagulable proteinaceous material is derived from whole animal blood.

11. The method of claim 1 wherein said first liquid containing heat coagulable proteinaceous material is derived from waste streams from the processing of potatoes.

12. The method of claim 1 wherein said first liquid containing heat coagulable proteinaceous material is derived from the processing of grain products.

* * * * *